United States Patent Office 3,066,406
Patented Dec. 4, 1962

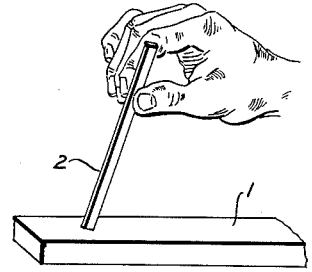
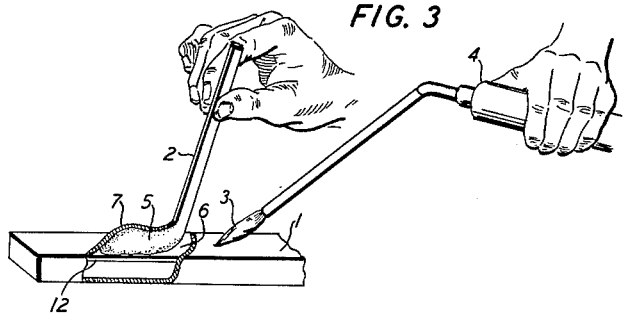
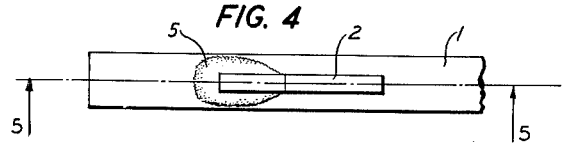
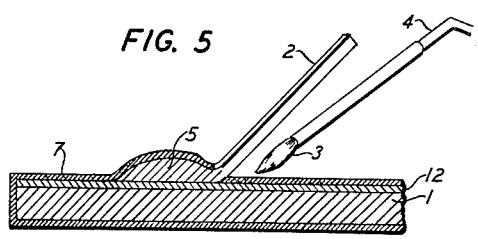
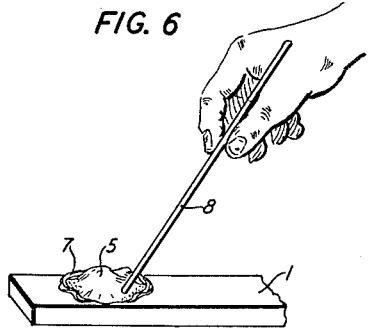
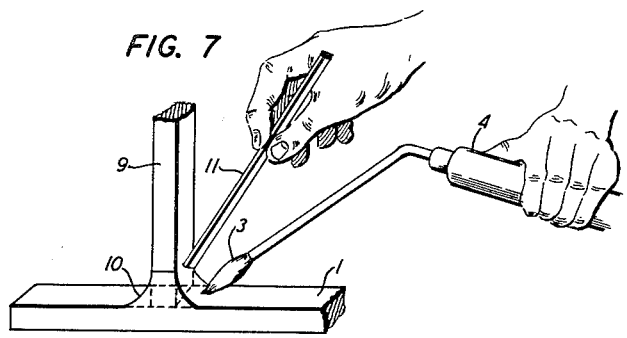

3,066,406
SOLDERING OF ZINC-CONTAINING SURFACES
Philip R. White, Murray Hill, N.J., assignor to Bell Telephone Laboratories, Incorporated, New York, N.Y., a corporation of New York
Filed Sept. 20, 1957, Ser. No. 685,191
5 Claims. (Cl. 29—498)

This invention relates to methods for soldering zinc to zinc, zinc to other metals, to joints so produced and to solder material suitable for use in such methods. The methods herein are particularly applicable to the tinning and/or soldering of galvanized material such as galvanized materials such as galvanized iron.

The soldering of galvanized iron surfaces and other zinc-containing materials is generally similar to the soldering of many common metals. In the soldering of such materials, it is first necessary to remove the zinc oxide and any other corroded surface materials present, after which molten solder is applied to the cleaned surface while preventing the formation of additional oxide on the metal surface, generally by the use of a flux. Fluxes recommended for removing and preventing further formation of such oxide layer are generally of the strong acid or salt type and include such materials as raw muriatic acid, cut muriatic acid (acid in which some zinc has been dissolved) and aqueous salt solutions such as those containing zinc chloride or 90 percent zinc chloride and 10 percent ammonium chloride.

As in other soldering operations the use of such strong fluxing materials causes difficulties both in use and in subsequent removal. In use, such materials are strongly corrosive, attacking the materials to be joined and presenting a danger to the user. Soldering of galvanized materials poses a special problem in this respect since attack by an acid or salt flux may eat all the way through the zinc coating thereby removing this protective layer from the region of the joint.

Once such a fluxed solder joint has been prepared it is necessary to completely remove any flux that remains. complete removal may necessitate the use of several scrubbing steps and boiling water rinses.

Although it is possible to solder galvanized surfaces with conventional low melting solder such as lead-tin containing up to about 0.5 percent antimony and utilizing the considerably less corrosive stearine or rosin fluxes, joints so prepared are fairly weak and do not age well.

By practice of the soldering methods described herein strong joints may be made between galvanized surfaces without the use of any fluxing material. These methods, which are equally applicable to the tinning and/or joining of zinc surfaces including galvanized iron and pure zinc or high zinc-containing alloys, make use of a series of solder materials many of which are already well known for their excellent mechanical and aging properties. Some of these materials have been used for many years in die-casting and are known to be virtually free from intergranular corrosion and change in dimension over life spans far exceeding 20 years. Others of these materials include the so-called high-melting zinc solders which have proved superior in the soldering of aluminum both from the mechanical and aging standpoint.

In accordance with the methods of this invention a surface predominating in zinc to be tinned or joined is wetted with a high zinc-containing solder of the class described herein, by raising the temperature of the area of the zinc-containing surface to be joined to the melting point of the solder, drawing or gently rubbing the solid solder across the surface so heated whereupon the molten solder material wets the surface and floats the oxide layer to the top of the molten portion, and thereafter stirring or puddling the molten portion of solder so as to disperse the oxide layer together with any additional oxide floating upon its surface.

A solder joint including a tinned surface such as that produced by the operations described in the preceding paragraph may be made in several ways. If, for example, it is desired to produce a lap joint between two such tinned surfaces, this may be done by sliding the surfaces together while the solder is in the molten state. In such event, the oxide layer is pushed or drawn aside by the sliding motion so that the separate puddling step may be dispensed with. Joints in which there is no overlapping of major surfaces, such as T or butt joints, may be prepared by placing the materials together in the desired positions and carrying out the tinning and joining procedures simultaneously in the manner described above. Where a T joint is to be prepared, it is desirable, although not necessary, to tin the horizontal or body member before joining.

Once a galvanized body has been tinned, as described, it may be joined with other metals by use of solders and techniques known to be effective with such metals, the zinc-containing solderings used herein being readily wetted by other common solder materials. Where the metal to be joined has a high aluminum-containing surface such surface may be joined to a zinc surface by use of the solder materials and in accordance with the techniques described in copending application Serial No. 678,271, filed August 15, 1957.

Since the solder materials used herein are rendered molten only at temperatures in excess of about 720° F., these processes do not easily lend themselves to the use of a soldering iron but are readily carried out by use of a gas flame such as from a propane, acetylene or oxyhydrogen torch.

For simplification, bodies or surfaces to be tinned or joined are referred to in the following description in terms of "zinc bodies" or "zinc surfaces." It is to be understood that this terminology has reference not only to bodies or surfaces of bodies predominating in zinc, but also to bodies containing such coatings as, for example, hot dip or electroplated galvanized iron or other material. This invention is, however, limited in its application to such bodies or coatings containing at least 80 percent zinc. Any of the methods described herein are equally applicable as applied to any composition within this range.

The accompanying drawings depict the process steps used in producing a tinned surface or a soldered joint in accordance with the methods herein.

FIG. 1 is a perspective view of a galvanized body to be tinned;

FIG. 2 is a perspective view of a bar of solder material contacting such a body;

FIG. 3 is a perspective view partly in section of an intermediate phase of a process herein in which a molten body of such material has wet the zinc surface and floated away a layer of zinc oxide;

FIG. 4 is a plan view of the intermediate phase of FIG. 3;

FIG. 5 is a cross-sectional view of such a galvanized body showing the contacting bar of solder, a molten region of such solder wetting the zinc surface and a layer of zinc oxide floating on the molten region;

FIG. 6 is a perspective view showing the puddling operation by which the layer of zinc oxide together with any solder oxide is dispersed so exposing the solder region; and FIG. 7 is a perspective view illustrating the formation of a T joint between two zinc-coated bodies in accordance with a method herein.

With further reference to the figures, the body 1 depicted in FIG. 1 is a zinc-coated material as, for example, commercial hot dip galvanized steel.

FIG. 2 depicts a bar 2 of a fusible zinc-containing material, hereinafter referred to as the solder material, such, for example, as the casting alloy known as "Zamak 3" contacting zinc-coated body 1.

In FIG. 3 gas flame 3 emanating from torch 4 has heated the upper surface of zinc layer 12 of body 1 to the melting point of material 2 so as to result in the formation of molten region 5 of the composition of material 2. At the stage depicted in this figure, solder material 2 has been moved across the surface of layer 12 under thermal conditions such as to result in the continuous contacting of solid surface 6 of solder bar 2 with the upper surface of layer 12 of body 1. Under such conditions, molten region 5 wets the zinc-containing layer 12 thereby floating zinc oxide layer 7 away from the upper surface of layer 12.

In accordance with the plan view of FIG. 4 which is a view of the same phase of the operation shown in FIG. 3, it is seen that molten solder region 5 has expanded laterally beyond the confines of the upper surface 12 of body 1 actually contacted at any time by solder bar 2, so that the area wetted exceeds that of the area which was contacted with the solid material of bar 2. Some of the zinc oxide has been drawn along the surface of solder region 5 by bar 2. For simplicity, the heating means is not shown in this view.

FIG. 5 is a sectional view of that phase of the operation shown in FIG. 4. In accordance with this view oxide layer 7, exaggerated in thickness, is shown to have been undermined by molten region 5 which wets galvanized layer 12. Also shown are solder bar 2, gas flame 3 and heating means 4.

FIG. 6 depicts a puddling operation by which oxide coating 7 is being broken and dispersed over the surface of molten solder 5 which wets galvanized layer 12. Any solder oxide formed is also dispersed by this operation. The puddling operation is being carried out with member 8 which may be the bar of solder, a piece of wood or any other material which will not introduce undesirable impurities into the solder. Material desirable from this standpoint will be evident from the discussion of desirable impurity limits of the solder material set forth in this description. Depending on the size and heat content of solder body 5 it may be desirable to maintain the surface of galvanized layer 12, in a heated condition by use of a heating means such as torch 4 shown in the preceding view. Puddling is a very rapid operation and may be accomplished merely by lightly drawing a puddling member, such as member 8, across the upper surface of the molten solder or, in the event a lap joint is to be formed, by sliding a similarly tinned zinc surface across the wetted surface of layer 12 while region 5 remains molten. All that is required here is that the oxide layer 7 be broken up. It is not required that this layer be completely removed.

After the puddling operation of FIG. 6, galvanized body 1 is tinned and a solder joint may be made thereto by use of any solder known to wet the second metallic body to be affixed. Where the second body is aluminum or an aluminum-containing alloy, or where it is an alloy predominating in zinc or a body coated with zinc, such as a galvanized body, the joining solder is preferably one of the compositions of this invention.

In FIG. 7 there is depicted the final step in the process of making a T joint between a galvanized body, such as body 1 shown positioned horizontally, and a second member such as member 9 which may also be a galvanized body. In the stage depicted, fillets 10 of a high melting solder composition set forth herein has been produced between bodies 1 and 9 by use of a solder bar 11 which is shown being drawn across the contiguous surfaces of bodies 1 and 9 which surfaces are maintained at the melting point of the solder material of bar 11 by use of gas torch 4 producing flame 3.

In forming a T joint such as that shown in FIG. 7 preliminary tinning is optional. If such tinning is desired body 1 may be first prepared in the manner described in connection with FIGS. 1 through 6 and may, at the stage depicted, be considered to include puddled region 5 shown in FIG. 6. Tinning may be dispensed with if care is taken to initially draw solder bar 11 across the joint lines thereby enabling the oxide layer to float to the top of the fillet and prevent weakening of the joint. If initial wetting occurs on a vertical surface of body 9 at a substantial distance from the contiguous horizontal surface of member 1 some oxide may be entrapped in the fillet, thereby weakening the joint.

By way of further example, experimental data relating to tensile strength of T joints prepared on both hot dip galvanized and electrogalvanized steel, and using three solder compositions of this invention are presented below. The physical dimensions of the members joined and the procedure followed in all the examples were identical. The horizontal member corresponding with body 1 of the figures and herein referred to as the "body" of the joint, was a sheet of galvanized steel of dimensions 1" x 2" x 0.034" thick. The 2" dimension was parallel with the joint. The vertical member corresponding with body 9 of FIG. 7 referred to herein as the "stem" was of dimensions 1" x 4" x 0.028" to 0.034" thick with the 1" dimension parallel with the joint. The body member was first tinned in accordance with the method described in conjunction with FIGS. 1 through 6, the area tinned being about ⅜" x 1¼". The stem member which was not tinned was joined to the body in the manner described in the description of accompanying FIG. 7. The data presented in each of the examples is an average of such data measured on 6 samples prepared in the same manner.

The breaking tensile strength of the galvanized steel samples was from 45,000 to 50,000 pounds per square inch. Accordingly, the tensile breaking stress of a 1" x 0.028" cross-section of the same material corresponding with the butting area of the stem of the joints is 1,260 pounds. Virtually all joints tested broke through the joint rather than through the stock. Weakening of galvanized steel from the heat treatment resulting from the soldering procedure was slight.

*Example 1*

A T joint was made as above, using a casting material designated "Zamak 3" as the solder material and hot dip galvanized steel as the body and stem materials. The composition of "Zamak 3" is discussed below. The resulting fillets were smooth and regular and of dimensions of approximately ⅛" vertically and 3/16" horizontally. When subjected to tensile strain the stem member broke through the joint, but not at a wetted surface, in all but one of the 6 samples. The remaining sample broke through the stem member at a height of about 1" from the joint. Rupture occurred under an average applied stress of 1068 pounds.

*Example 2*

A T joint was made using "Zamak 3" and electrogalvanized stem and body members. The fillet dimensions and appearance were the same as in Example 1. Severance occurred through the joint in each instance under an average applied stress of 821 pounds.

*Example 3*

Body and stem members of hot dip galvanized steel were soldered together using zinc-4 percent aluminum solder. Fillet dimensions and appearance were the same as above. Severance occurred through the joint under an average applied stress of 1075 pounds.

Example 4

Body and stem members of hot dip galvanized steel were soldered together using zinc-0.1 percent magnesium. Fillet dimensions and appearance were as above. Severance occurred through the joint under an average applied stress of 346 pounds. This solder was somewhat less workable than the solders of the preceding examples.

Many solder compositions are suitable in the practice of this invention. All such solder compositions contain at least 90 percent zinc and may in addition contain small amounts of other added ingredients included to improve handling properties of the solder, mechanical strength, and corrosion resistance of the resultant joint. As is well known in the metal working arts the properties of zinc and alloys predominating in zinc may be seriously affected by the inclusion of relatively small amounts of certain impurities. For example, materials such as lead, tin and cadmium have the effect of promoting intergranular corrosion. Permissible impurity limits from such a standpoint are well known to those skilled in the casting art and such limits are not set forth herein.

For the purpose of this invention it is preferred that the zinc included in any of the solder compositions be of a 99.99 percent purity. Such a material marketed by the New Jersey Zinc Company is known as "Special High Grade Zinc." It is to be understood that considerations as to such impurity limits are of primary concern only with regard to the aging of the joint. Where, by the nature of the particular objective, aging is not of paramount concern, the impurity limits may be exceeded without substantially affecting the workability of the solder or the immediate appearance or strength of the resultant joint.

Illustrative solders suitable for use in these processes include 99.99 percent zinc with no added ingredients and zinc-aluminum solders containing up to 10 percent aluminum but preferably no more than about 6 percent aluminum, typified by the zinc-4 percent aluminum of Example 3. The additional small amounts of magnesium to zinc-containing materials has a known stabilizing effect in slowing down beta transformation, corrosion and growth. In general, the amount of such magnesium addition should not be greater than about 0.2 percent since greater amounts seriously affect the working property of the solder. An example of such a solder is the zinc-0.1 percent magnesium of Example 4.

Two well-known casting metals predominating in zinc and having excellent aging properties are preferred solder materials for the practice of this invention. These materials are designated "Zamak 3" and "Zamak 5." The composition limits of "Zamak 3" specified by ASTM in Specification B86 are as follows:

Added ingredients:
   Aluminum_____ 3.5 to 4.3%.
   Magnesium_____ 0.03 to 0.08%.
Impurities:
   Copper_____ 0.1% max.
   Lead_____ 0.007% max.
   Cadmium_____ 0.005% max.
   Tin_____ 0.005% max.
   Iron_____ 0.100% max.

The remainder of this composition is zinc.

"Zamak 5" differs from "Zamak 3" in that it contains 1 percent copper which is about the solid solubility of copper in 4 aluminum-96 zinc. The nominal composition contains 0.03 percent magnesium rather than 0.04 percent. The impurity limitations are the same.

From the examples it is seen that "Zamak 3" and zinc-4 percent aluminum joints are of a tensile strength superior to those of joints using zinc-0.1 percent magnesium solders. The physical and aging characteristics of the solders used herein, although not before used in the tinning or soldering of zinc surfaces, are well known. "Zamak 3" and "Zamak 5" are well known casting metals noted for their high tensile strength and good aging properties. The other solder materials of the examples are known in the aluminum soldering field and are there recognized to be superior both from the standpoint of physical characteristics and corrosion resistance with respect to the medium and lower melting solders used in that art.

The invention has been described in terms of the preparation of a T joint. This joint was chosen since it is generally considered to be the most difficultly made of the common joints. The specific steps discussed in connection with the figures all relate to the making of such a joint and may not be directly applicable to other types of joints. The invention is not limited to the specific sequence of steps shown either in the preparation of a T joint or in the preparation of any other joint. In a broad sense the processes of this invention may be considered to be tinning processes rather than soldering techniques since once the tinning procedure has been accomplished subsequent jointing may be in accordance with any conventional means and using any solder suitable for the material to be joined to the tinned surface. Where a preliminary tinning procedure is not carried out, in accordance with the conventions of the soldering art, it is considered that tinning and joining are carried out simultaneously. Specifically, although it is a requirement of the processes herein that the oxide layer floated to the top of the molten body of solder be dispersed subsequent to jointing, a separate puddling member, such as that depicted in FIG. 6, may not be necessary. For example, where a T joint is to be formed, such puddling may be accomplished by moving the stem of the T across the surface of the molten solder so as to produce the same effect.

Due to the very narrow temperature working range between the melting point of the usual hot dip galvanized surface, about 787° F., and that of a solder composition used herein, of the order of 714° F. and higher some difficulty results in maintaining the galvanized surface solid during the tinning or soldering procedure. It has been found, however, that maintaining such layer solid is not a requirement of the process herein, no difference in the physical characteristics or strength of the joint being noted where the galvanized layer was permitted to melt. If, however, the layer is rendered molten, excessive heating time may result in embrittlement of the resultant joint due to formation of appreciable amounts of iron-zinc alloy at the interface. Such difficulty is not noted in reasonable operations using non-magnesium-containing zinc sulfurs but may explain the comparatively poor strength of the joints of Example 4.

Although as noted the processes herein are applicable to a variety of zinc-surfaced materials using a variety of solder compositions, certain characteristics should be noted. In general, an electrogalvanized layer is somewhat thinner and less tenacious than a hot dip galvanized layer. In working with such electroplated surfaces care should be taken to avoid overheating and consequently burning the coating.

Although the technique has been specifically described in terms of contacting a surface to be tinned with a bar of solder and heating the surface to be tinned, this sequence is of no concern providing the surface to be tinned is at or above the melting point of the solder when the solid solder is drawn or otherwise moved across the surface.

What is claimed is:

1. Method of joining body surfaces each made of a metal selected from the group consisting of zinc and zinc alloys containing at least 80 percent zinc by use of a solid fusible material selected from the group consisting of zinc and zinc-aluminum alloys containing at least 90 percent zinc, comprising heating the surfaces to be joined to a temperature at least as high as the melting point of the said fusible material, contacting the surfaces so heated with said solid fusible material, moving the said contacting solid fusible material across the surfaces to be joined so as to wet both of the said surfaces with molten regions of the said fusible material and to float an oxide layer to a surface of the said molten regions, and producing a common molten region by causing the said molten regions to intermingle while puddling the said intermingled molten regions so as to disperse the said oxide layer.

2. Method in accordance with claim 1 in which the said body surfaces are placed in juxtaposition before joining and in which a molten region common to the said surfaces is initially formed.

3. Method in accordance with claim 1 in which the said body surfaces are initially wetted and subsequently placed in juxtaposition and joined.

4. Method in accordance with claim 1 in which the said fusible material is a zinc alloy which contains up to 6 percent by weight of aluminum.

5. Method in accordance with claim 1 in which the said fusible material consists essentially of from 3.5 to 4.3 percent by weight of aluminum, 0.03 to 0.08 percent by weight of magnesium, balance zinc.

References Cited in the file of this patent

UNITED STATES PATENTS

| | | |
|---|---|---|
| 549,610 | Ramage | Nov. 12, 1895 |
| 733,662 | Lange | July 14, 1903 |
| 933,433 | Guggenbuhl | Sept. 7, 1909 |
| 1,340,264 | Dean | May 18, 1920 |
| 2,087,716 | Banscher | July 20, 1937 |
| 2,100,255 | Larson | Nov. 23, 1937 |
| 2,426,650 | Sivian | Sept. 2, 1947 |
| 2,487,001 | Taylor et al. | Nov. 1, 1949 |
| 2,588,700 | Carpenter | Mar. 11, 1952 |
| 2,733,168 | Hodge et al. | Jan. 31, 1956 |

FOREIGN PATENTS

| | | |
|---|---|---|
| 964,788 | France | Aug. 24, 1950 |
| 887,873 | Germany | Aug. 27, 1953 |
| 522,724 | Great Britain | June 25, 1940 |
| 604,194 | Great Britain | June 30, 1948 |
| 637,945 | Great Britain | May 31, 1950 |